(12) United States Patent
Derbier (10) Patent No.: US 11,748,342 B2
(45) Date of Patent: Sep. 5, 2023

(54) NATURAL LANGUAGE BASED PROCESSOR AND QUERY CONSTRUCTOR

(71) Applicant: Cloud Software Group, Inc., Fort Lauderdale, FL (US)

(72) Inventor: Raphael Derbier, Palo Alto, CA (US)

(73) Assignee: Cloud Software Group, Inc., Fort Lauderdale, FL (US)

( * ) Notice: Subject to any disclaimer, the term of this patent is extended or adjusted under 35 U.S.C. 154(b) by 0 days.

(21) Appl. No.: 17/396,407

(22) Filed: Aug. 6, 2021

(65) Prior Publication Data

US 2023/0042940 A1    Feb. 9, 2023

(51) Int. Cl.
| | |
|---|---|
| *G06F 16/242* | (2019.01) |
| *G06F 16/28* | (2019.01) |
| *G06F 40/205* | (2020.01) |
| *G06F 40/253* | (2020.01) |
| *G06F 16/248* | (2019.01) |

(52) U.S. Cl.
CPC .......... *G06F 16/243* (2019.01); *G06F 16/248* (2019.01); *G06F 16/288* (2019.01); *G06F 40/205* (2020.01); *G06F 40/253* (2020.01)

(58) Field of Classification Search
CPC .... G06F 16/243; G06F 16/248; G06F 16/288; G06F 40/205; G06F 40/253
USPC .......................................................... 707/769
See application file for complete search history.

(56) References Cited

U.S. PATENT DOCUMENTS

| | | | |
|---|---|---|---|
| 7,027,974 B1 | 4/2006 | Busch et al. | |
| 2003/0217052 A1* | 11/2003 | Rubenczyk | ........... G06F 16/951 |
| 2006/0047632 A1 | 3/2006 | Zhang | |
| 2007/0106499 A1* | 5/2007 | Dahlgren | ............. G06F 16/243 |
| | | | 704/10 |
| 2007/0226246 A1 | 9/2007 | Dheap et al. | |

(Continued)

OTHER PUBLICATIONS

Christina Sun, A Natural Language Interface for Querying Graph Databases, Submitted to the Department of Electrical Engineering and Computer Science Engineering, Massachusetts Institute of Technology, 2017.

(Continued)

*Primary Examiner* — Dung K Chau
(74) *Attorney, Agent, or Firm* — McGuire Woods LLP (57) ABSTRACT

An apparatus comprising an interface and a natural language processor. The interface receives a data retrieval request formatted in a natural language and the natural language processor processes the data retrieval request. Processing the data retrieval request includes identifying database entities, database relations, or any combination thereof based words in the data retrieval request. It can also include identifying database entity criterion, database relation criterion, or any combination thereof based on words in the data retrieval request. It also includes generating a database query based on the database entities, the database relations, the database entity criterion, the database relation criterion, or any combination thereof and causing the database query to be applied to a database. Wherein, processing the data retrieval request includes grammatically tagging the data retrieval request using part-of-speech tagging techniques, e.g. grammatical type, grammatical context, semantic, or any combination thereof, and a database ontology.

20 Claims, 7 Drawing Sheets

(56) References Cited

U.S. PATENT DOCUMENTS

| | | | | |
|---|---|---|---|---|
| 2010/0106485 A1* | 4/2010 | Lu | ............................ | G06Q 30/02 |
| | | | | 707/E17.015 |
| 2014/0282120 A1 | 9/2014 | Sun et al. | | |
| 2016/0034305 A1* | 2/2016 | Shear | ....................... | H04L 47/70 |
| | | | | 707/722 |
| 2016/0224542 A1 | 8/2016 | Bulgakov et al. | | |
| 2018/0314689 A1* | 11/2018 | Wang | ................... | G10L 15/1822 |
| 2020/0342052 A1* | 10/2020 | Flann | ..................... | G06F 40/211 |
| 2021/0303555 A1* | 9/2021 | Kim | ....................... | G06F 16/284 |

OTHER PUBLICATIONS

Sudarshan Awale et al., Information Retrieval from Ontology Using Natural Language Interface, International Journal of Current Engineering and Scientific Research vol. 2, Issue—2,2015, Dept. of Computer Technology, Yeshwantrao Chavan College of Engg. Nagpur (Maharashtra), India.

\* cited by examiner

| POS TAGS | |
|---|---|
| CC Coord Conjuncn | and, but, or |
| CD Cardinal number | one, two |
| DT Determiner | the, some |
| EX Existential there | there |
| FW Foreign Word | mon dieu |
| IN Preposition | of, in, by |
| JJ Adjective | big |
| JJR Adj., comparative | bigger |
| JJS Adj., superlative | biggest |
| LS List item marker | 1, One |
| MD Modal | can, should |
| NN Noun, sing. or mass | dog |
| NNP Proper noun, sing. | Edinburgh |
| NNPS Proper noun, plural | Smiths |
| NNS Noun, plural | dogs |
| POS Possessive ending | 's |
| PDT Predeterminer | all, both |
| PRP$ Possessive pronoun | my, one's |
| PRP Personal pronoun | I, you, she |
| RB Adverb | quickly |
| RBR Adverb, comparative | faster |
| RBS Adverb, superlative | fastest |
| RP Particle | up, off |
| SYM Symbol | +, %, & |
| TO 'to' | to |
| UH interjection | oh, oops |
| VB verb, base form | eat |
| VBD verb, past tense | ate |
| VBG verb, gerund | eating |
| VBN verb, past part | eaten |
| VBP Verb, present | eat |
| VBZ Verb, present | eats |
| WDT Wh-determiner | which, that |
| WP Wh pronoun | who, what |
| WP$ Possessive-Wh | whose |
| WRB Wh-adverb | how, where |

FROM FIG. 2A 16A-5 — Final output representing the graph structure of the data to retrieve

```
{
  "type": "ENTITY",
  "entityName": "account",
  "predicates": [
    {
      "edgepath": [
        "account_region"
      ],
      "filters": [
        {
          "attribute": "uuid",
          "func": "eq",
          "attributeValue": "emea"
        }
      ]
    }
  ],
  "countpredicates": [
    {
      "func": "gt",
      "count": "2",
      "entityName": "deal",
      "filters": [
        {
          "attribute": "revenue",
          "func": "gt",
          "attributeValue": "100000"
        }
      ]
    }
  ],
  "groupby": "industry",
  "summary": {
    "func": "count"
  }
}
```

NATURAL LANGUAGE BASED PROCESSOR AND QUERY CONSTRUCTOR

BACKGROUND

Natural Language Processing (NLP) tools used to process natural language and render a relevant service are prevalent in residential and business applications. NLP tools are used to process natural language in the form of text or voice entry, discern a user's intent, and render a known service using a complex Artificial Intelligence (AI) based algorithmic model and the discerned intent. NLP tools use Part of Speech (POS) tagging techniques, word-chunking techniques, and AI predictive analysis techniques, such as classification based pattern-matching techniques found in many supervised Machine Learning (ML) based algorithmic models, to search for and discover relevant entries in a digital library. POS tagging is used to grammatically identify and label words in a sentence structure and word-chunking is used to group certain words together to form phrases. Based on the labeled words and phrases and a parameter space of the AI based algorithmic model, the NLP tool can identify certain words and phrases that are relevant to one or more digital libraries and, therefore, establish a user's intent. The NLP tool can then use these certain words and phrases and a pattern-matching technique of the AI based algorithmic model to search for and discover a relevant service in a digital library or libraries. Some web bots and chat bots are examples of NLP tools. However, because these tools rely on complex AI based pattern-matching techniques to process entries in a digital library in order to predict a particular service based on intent, this technical approach is considered quite complex and, therefore, expensive to build, resource intensive, and prone to errors.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related criterion, which will vary from one implementation to another. Moreover, it will be appreciated that such a development effort might be complex and time-consuming but would be a routine undertaking for those of ordinary skill in the art having the benefit of this disclosure.

As previously stated, traditional NLP tools use POS tagging techniques, word-chunking techniques, a parameter space of a complex algorithmic model, and an ML based pattern-matching technique to process natural language and render a particular service. POS tagging techniques, word-chunking techniques, and the parameter space are used to identify relevant words and phrases in a natural language construct to establish user's intent. These relevant words and phrases can then be used by the pattern-matching technique, such as Hidden Markov Model or neural networks, to predict relevant entries in a data repository (digital library) in order to render a service based on the intent. Due to the complexity of these tools and their inherent problems, a need exists for a less complex, more efficient, and more reliable alternative.

An improved solution, presented herein, to that of currently available NLP tools that rely upon ML based pattern matching techniques is an NLP tool that uses POS tagging techniques, word-chunking techniques, and an enhanced database query translator. The NLP tool uses grammatical tagging techniques and word-chunking techniques to identify words and phrases that establishes a user's intent. The database query translator uses text corpuses and highly structured database ontologies to build database queries based on the user's intent that can be executed against a database repository or repositories in a traditional manner. The NLP having the enhanced query translated is much less complex, more efficient, and accurate.

Presented in this disclosure is an apparatus comprising an interface and a natural language processor. The interface receives a data retrieval request formatted in a natural language and the natural language processor processes the data retrieval request. Processing the data retrieval request includes: identifying at least one database entity, at least one database relation, at least one database entity criteria, at least one database relation criteria, or any combination thereof based on at least one word in the data retrieval request. Additionally, processing includes generating a database query based on the at least one database entity, the at least one database relation, the at least one database entity criteria, the at least one database relation criteria, or any combination thereof. Processing also includes causing the database query to be applied to a database. Also, the natural language processor uses database domain ontology to process the data retrieval request. Also presented in this disclosure is a system comprising the apparatus and a database for receiving the database query, retrieving relevant data based on the query, and generating a response populated with the relevant data.

In some embodiments, processing of the data retrieval request further includes grammatically tagging the data retrieval request, identifying at least one selected from a group consisting of a linguistic group, a common entity noun, a database entity, a database entity criteria, a database relation, and a database relation criteria using the tagged data retrieval request and the database domain ontology, and creating at least one chunk, each chunk comprising at least one selected from a group consisting of the linguistic group, the common entity noun, the database entity, the database relation, the database entity criteria, and the database relation criteria. Processing the data retrieval request can also include grammatically tagging the data retrieval request by identifying each word or multiple words as having a grammatical type, grammatical context, semantic, or any combination thereof. In some embodiments, processing the data retrieval request includes associating each chunk comprising the database entity criteria or database relation criteria with the common entity noun, the at least one database entity, the at least one database relation, or any combination thereof using the database ontology. In addition, each chunk comprising the database entity criteria or database relation criteria can be associated with the common entity noun, the at least one database entity, the at least one database relation, or any combination thereof based on attribute proximity to the common entity noun, the at least one database entity, the at least one database relation, or any combination thereof. In some embodiments, the at least one database entity criteria or the at least one database relation criteria comprises at least one database attribute, at least one database function, at least one value, or any combination thereof. Additionally, the database ontology can comprise one or more text corpus, a database schema, a database base model, or any combination thereof.

Also presented in this disclosure is a method comprising: receiving a data retrieval request formatted in a natural language; identifying at least one database entity, at least one database relation, at least one database entity criteria, at least one database relation criteria, or any combination thereof based on at least one word in the data retrieval request; generating a database query based on the at least one database entity, the at least one database relation, the at least one database entity criteria, the at least one database relation criteria, or any combination thereof; and causing the database query to be applied to a database.

In some embodiments, the method further comprises: grammatically tagging the data retrieval request; identifying at least one selected from a group consisting of a linguistic group, a common entity noun, a database entity, a database entity criteria, a database relation, and a database relation criteria using the tagged data retrieval request and the database domain ontology; and creating at least one chunk, each chunk comprising at least one selected from a group consisting of the linguistic group, the common entity noun, the database entity, the database relation, the database entity criteria, and the database relation criteria.

The method, in some embodiments, comprises grammatically tagging the data retrieval request by identifying each word or multiple words as having a grammatical type, grammatical context, semantic, or any combination thereof. The method can also include associating each chunk comprising the database entity criteria or database relation criteria with the common entity noun, the at least one database entity, the at least one database relation, or any combination thereof using the database ontology. The method, in some embodiments, comprises associating each chunk comprising the database entity criteria or database relation criteria with the common entity noun, the at least one database entity, the at least one database relation, or any combination thereof based on attribute proximity to the common entity noun, the at least one database entity, the at least one database relation, or any combination thereof. Additionally, the database ontology comprises one or more text corpus, a database schema, a database base model, or any combination thereof.

Figure 1A:
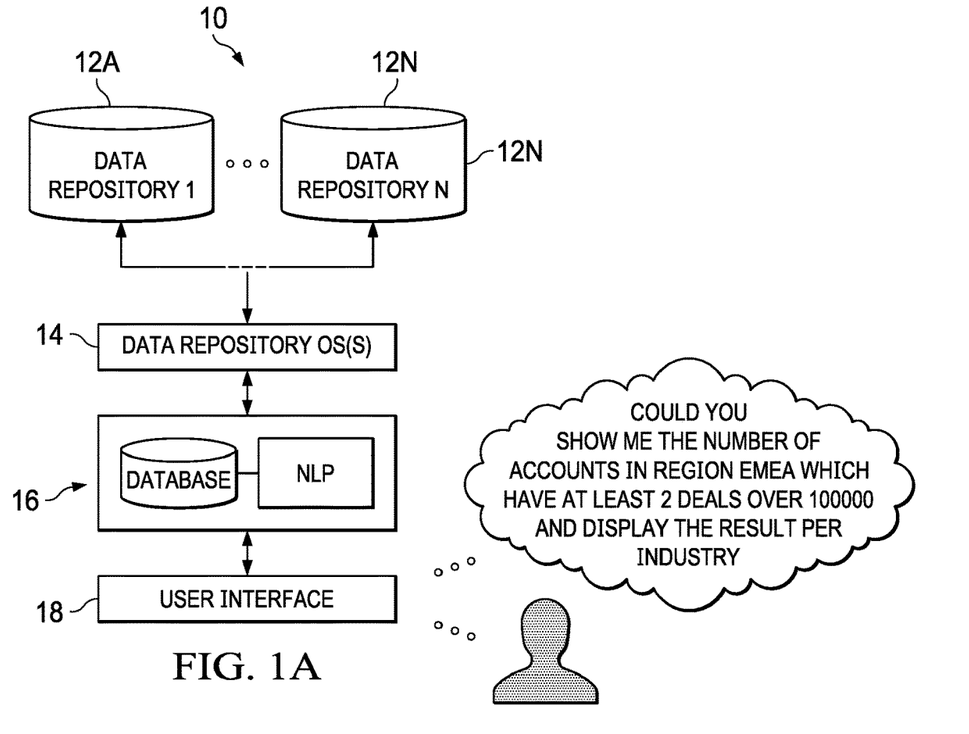
FIG. 1A is an illustration of a diagram of a system for processing natural language using database domain ontologies and text corpuses to construct an actionable service, such as database query, in accordance with certain example embodiments.

Referring to FIG. 1A, illustrated is a diagram of a system for processing natural language using database domain ontologies and text corpuses to construct an actionable service, such as database query, in accordance with example embodiments, denoted generally as 10. The system 10 comprises data repositories 12A through 12N, database repository OS(s) (Operating System or systems), an NLP tool 16, and a user interface 18. The database repository OS can be any type of database OS including a graph database and a relational database. The NLP tool 16 can comprise a natural language processor and a database of text corpuses and database domain ontologies.

A user using the interface 18 can enter, either by typing or speaking, a text string, such as "could you show me the number of accounts in region EMEA which have at least 2 deals over 100000 and display the result per industry." The NLP tool 16 can then identify a user's intent and construct a database query. The NLP tool 16 uses the user input, speech tags, one or more text corpuses, one or more database domain ontologies, or any combination thereof to perform POS tagging techniques, word-chunking techniques, and criteria establishment. The details of which are described in reference to FIGS. 2A-2B. The result of the tagging techniques, word-chunking techniques, and criteria establishment determines user's intent with respect to an actionable service. Based on this determined intent, the NLP tool 16 can generate a database query or other actionable service for execution.

A text corpus can comprise words, phrases, synonyms, and chunking tokens associated therewith. The text corpus can also comprise historical data (use of certain words and phrases and their meaning) based on user experiences. The historical data can make the translation from a natural language to a format capable of rendering an actionable service more efficient. A database domain ontology can comprise words, phrases, synonyms, and chunking tokens associated therewith. The database domain ontology can also comprise historical data (use of certain words and phrases and their meaning) based on user experiences. The historical data can make the translation from a natural language to a format capable of rendering a database specific actionable service more efficient. A database domain ontology is specifically structured around one or more database OS's whereas a text corpus is an auxiliary data source used to augment the database domain ontology. The NLP tool 16 can construct actionable services using the database domain ontology, the text corpus, or both. The text corpuses and database ontologies can include words and phrases in any language.

A chunking token as used herein is a defined parameter recognizable by the NLP tool 16 that is used to identify meaning of a word, map words together to form meaningful phrases, and map the words and phrases to a means. The means can be, for example, a database query construction component of the NLP tool 16 capable of building queries and rendering database services. The chunking tokens of a database domain ontology, for example, can be used to identify database parameters, parameter values, or any combination thereof in a user's language. The chunking tokens of a text corpus can be used to identify device parameters (associated with a printer or an email server for example), parameters values, or any combination thereof. The parameters and values can relate to database entities, database relations, database equations, database functions, database entity criterion, database relation criterion, and other device related features.

It should also be understood that the database ontology and/or a text corpus can include other words and phrases related to features of a database OS and application such as connectivity and security functions. The NLP tool 16 can use these features to establish communications with an appropriate database repository 12 or other device, such as a printer or email server, based on a user's input. A user of the system 10 can populate a database of the NLP tool 16 with various device schemas, database schemas, database models, OS make, model, and version associated with different applications and OS's of devices database repositories. The NLP tool 16 can generate the appropriate ontologies, e.g. based on guidance from a database expert and/or data scientist.

Figure 1B:
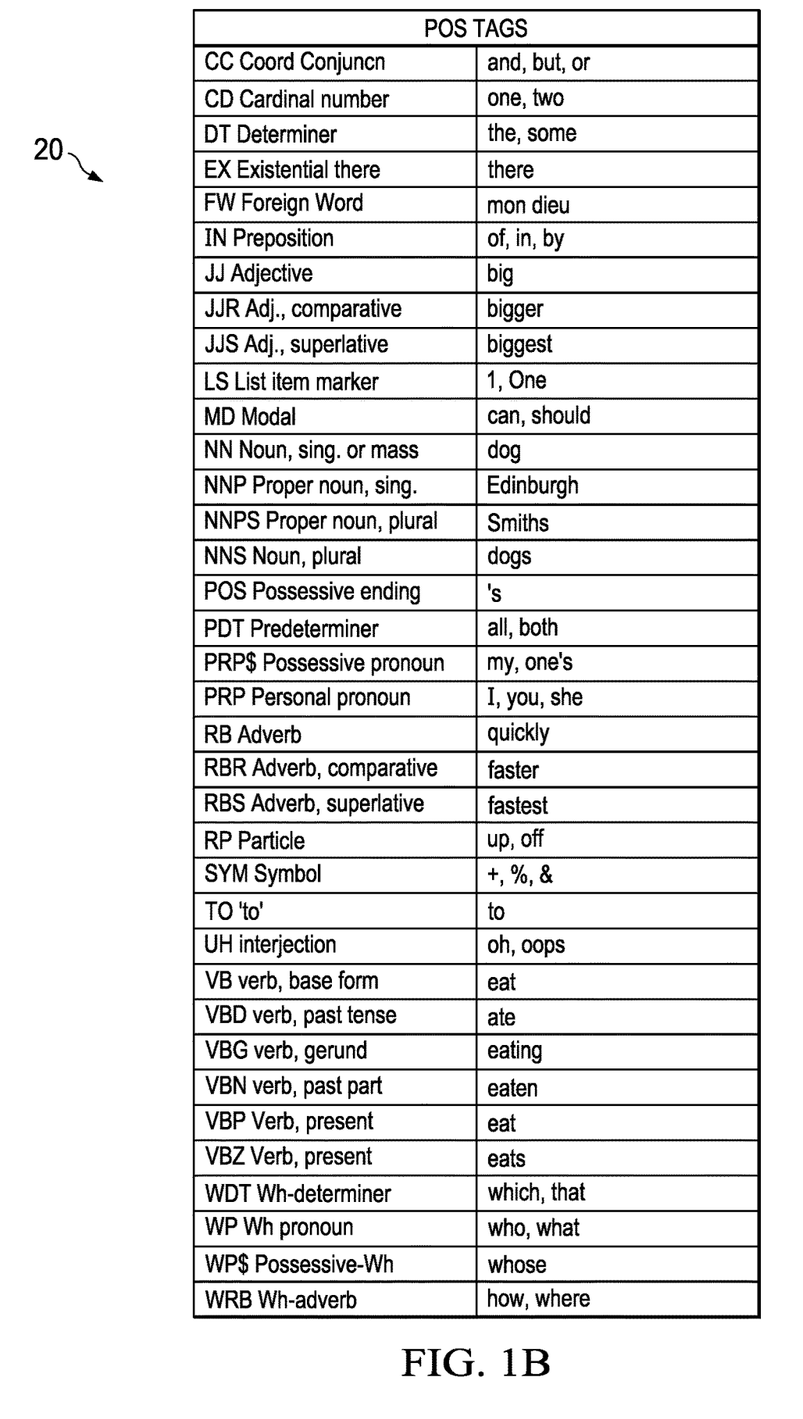
FIGS. 1B-1D are illustrations of a table of speech tags used in POS (Part-Of-Speech) tagging, a table listing sample of entries of words and phrases of a database domain ontology, and a diagram of a sample of entries and criteria for a database domain ontology, in accordance with certain example embodiments.
Figure 1C:
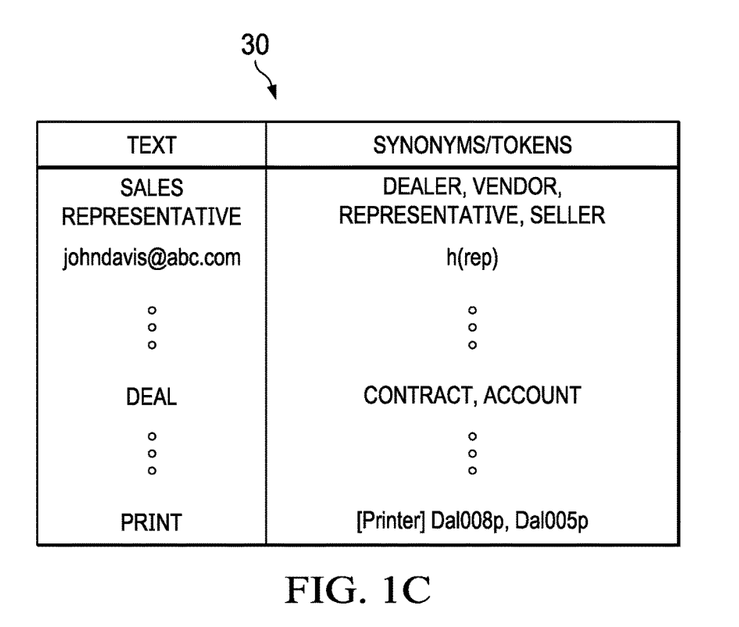
Figure 1D:
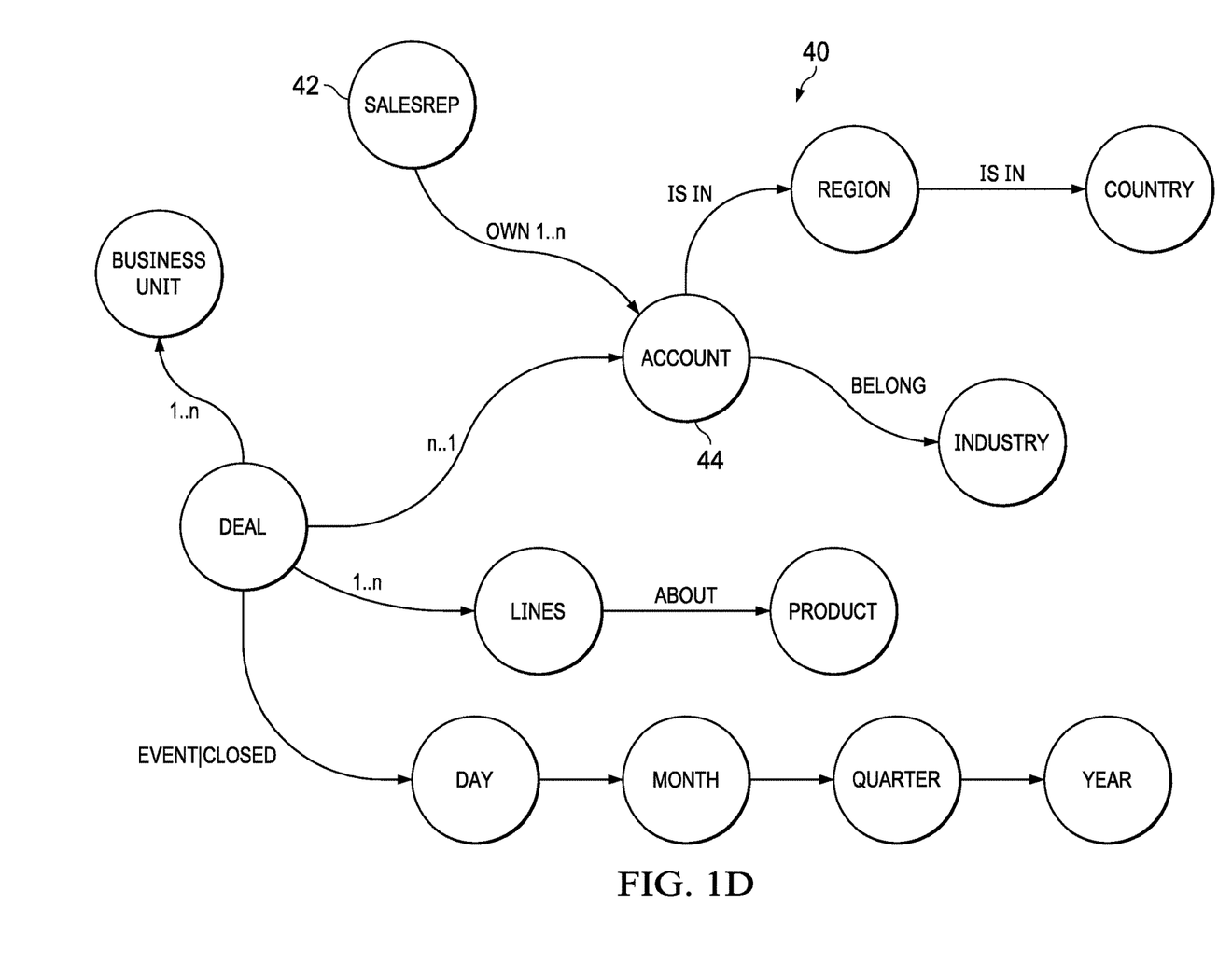

Referring now to FIGS. 1B-1D, illustrated are a table of speech tags 20 used in POS tagging, a table listing entries of a database domain ontology 30, and a diagram of a sample of entries for a database domain ontology 40, in accordance with example embodiments. Referring to FIG. 1B, the table of speech tags 20 is an extensive, but not exhaustive, list of tags. The tags are used to mark a part-of-speech to identify lexical and grammatical properties of a sentence. However, the applicant has found that CD (identify cardinal numbers), IN (identify potential relations expressed as a preposition or prepositions), NN, NNP, and NNPS (to identify potential nouns and plural), and VB, VBD, VBG, VBN, VBP, and VBZ (to identify relations expressed as verbs), are extensively used in the speech tagging logic of the NLP tool 16 and in many cases are sufficient to grammatically tag a sentence structure.

In FIG. 1C, illustrated is a sample of entries of a text corpus 40, according to certain example embodiments. The text corpus 40 includes words and their synonyms, such as sales and dealer, vendor, representative, and seller. The text corpus 40 include a historical entry for user name johndavis@abc.com and historical preference of rep for sales representative. The text corpus also includes a text entry for "print' that maps to a token entitled [printer]. The token itself also maps to printer devices "Dal008p" and Dal005p."

Referring now to FIG. 1D, illustrated is the diagram of a sample of entries for a database domain ontology 40, according to certain example embodiments. The entries of the database domain ontology 30 can comprise words, synonyms, phrases (historical or otherwise) that describe database parameters, such as database entities, criteria, relations, functions, and equations of a database domain, values, or both. The database domain ontology can be created using text corpuses, database schemas, database models, and database OS supported processes, functions, and equations. Text corpuses and other a-priori information, such as historical data, can be used to determine certain user requests that cannot be determined using a database domain ontology. Database schemas provide detailed information of a database structure and its limitations. Database models comprise various methods (processes) and functions typically associated with functional features of an instantiated model used for operating on a database. Different types of methods can be associated with a database model and a database OS. A database OS can provide all functions available for a particular database repository whereas a database model can provide all the functions made available by an application programmer that has designed an application around the database OS. The equation and functions can range anywhere from simple addition and subtraction to advanced statistics based algorithmic models.

The sample entries include a plurality of database entities, database relations, and predicates (criterion). The database entity 42 can be a table parameter ("SALESREP"), a table variable ("SALESREP": "Janet Dean"), or both. In this particular case, "SALESREP" is a database entity and the associated criteria is "Janet Dean." A database entity 42 can have database relations. A database relation 44 can be a table parameter ("SALESREP": "ACCOUNT"), table parameters and values ("SALESREP": "Janet Dean", "ACCOUNT": "$1000.00, $12000.00, $1100.00, . . . "), or both. "ACCOUNT" is a relational entity to "SALESREP." "Janet Dean" and "$1000.00, $12000.00, $1100.00 . . . " are relational criterion to "ACCOUNT" and "SALESREP." The words and phrases "OWN 1 . . . n," "IS IN," "BELONG," etc. . . . are database predicates that are specific to a database OS.

Using another example user entry of "could you show me the number of accounts for Janet Dean in region EMEA which have at least 2 deals over 100000 and display the result per industry," the NLP tool 16 can use POS tags, a text corpus, and a database domain ontology to identify: the database entity "SALESREP;" the database relations "ACCOUNT," "REGION," "COUNTRY," "DEAL," and "INDUSTRY;" the database entity criterion "Janet Dean", "EMEA": 2 or more over $1000; a sum function ("the number of accounts"); a greater than or equal to function ("at least 2"); and an action "display per industry." It should be understood that a criteria could also be a database entity or database relation. For example, "COUNTRY" and "REGION" can be criterion of "ACCOUNT," "Janet Dean" can be a criteria of "ACCOUNT," and "EMEA" can be a criteria of "REGION." Functions and criterion can be derived from a user's chosen words. Such as two or more can be discerned to mean a function of greater than or equal to with a criteria of two. Based on word identification, the NPL tool 16 can chunk words together using the tokens, chunk phrases together using the tokens, and group chunked words and phrases together using additional tokens. The NPL tool 16 can then seed the chunked words, phrases, and grouped chunks with criterion provided by the user, a database domain ontology, text corpus, or any combination thereof. The NPL tool 16 can then build an actionable service, e.g. database query, for execution.

Figure 2A:
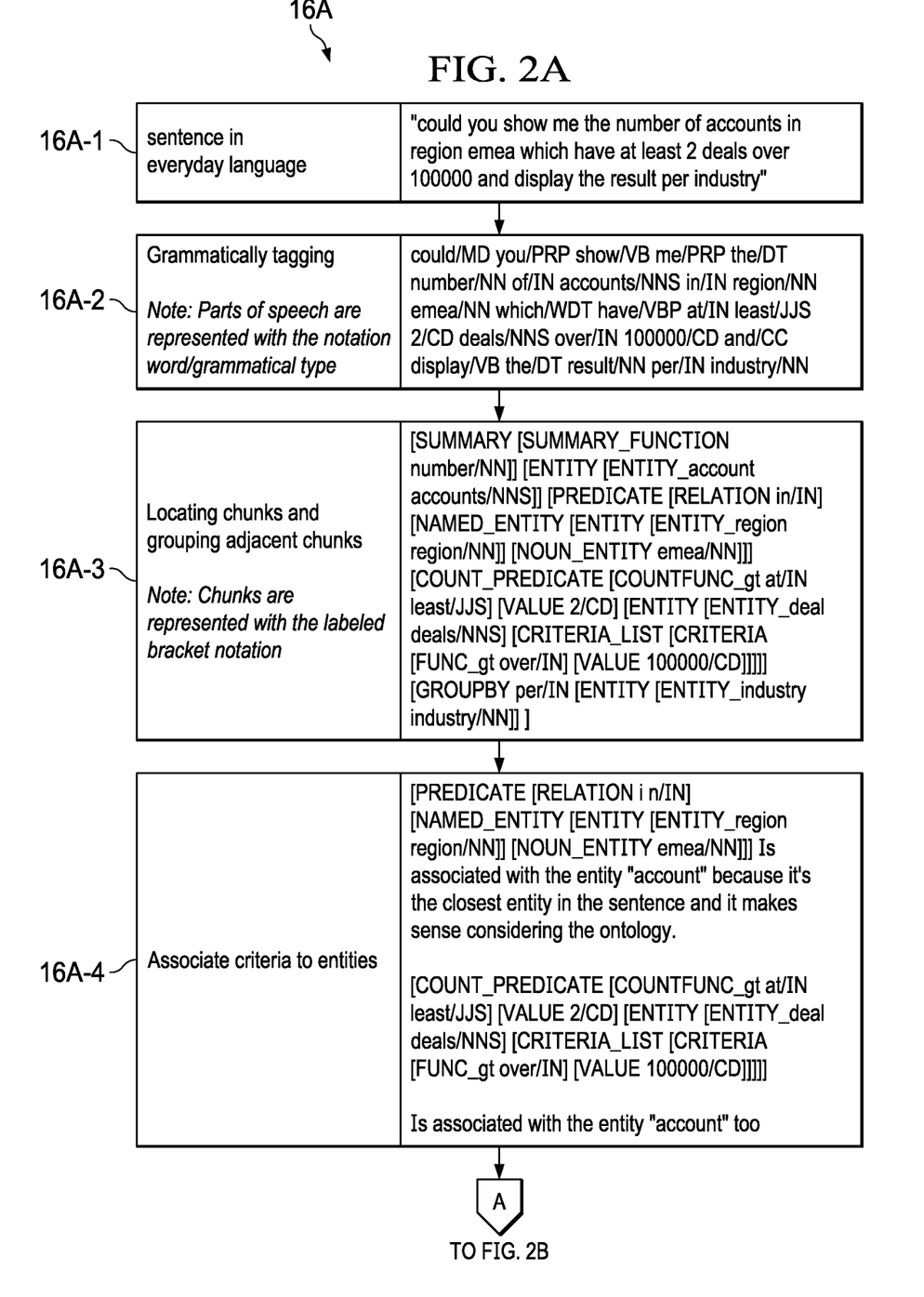
FIGS. 2A-2B are illustrations of flow diagrams of an algorithm of a natural language processing tool that performs POS tagging, word-chunking, criteria establishment, and query construction using text corpuses, database domain ontologies, or any combination thereof, in accordance with certain example embodiments.
Figure 2B:
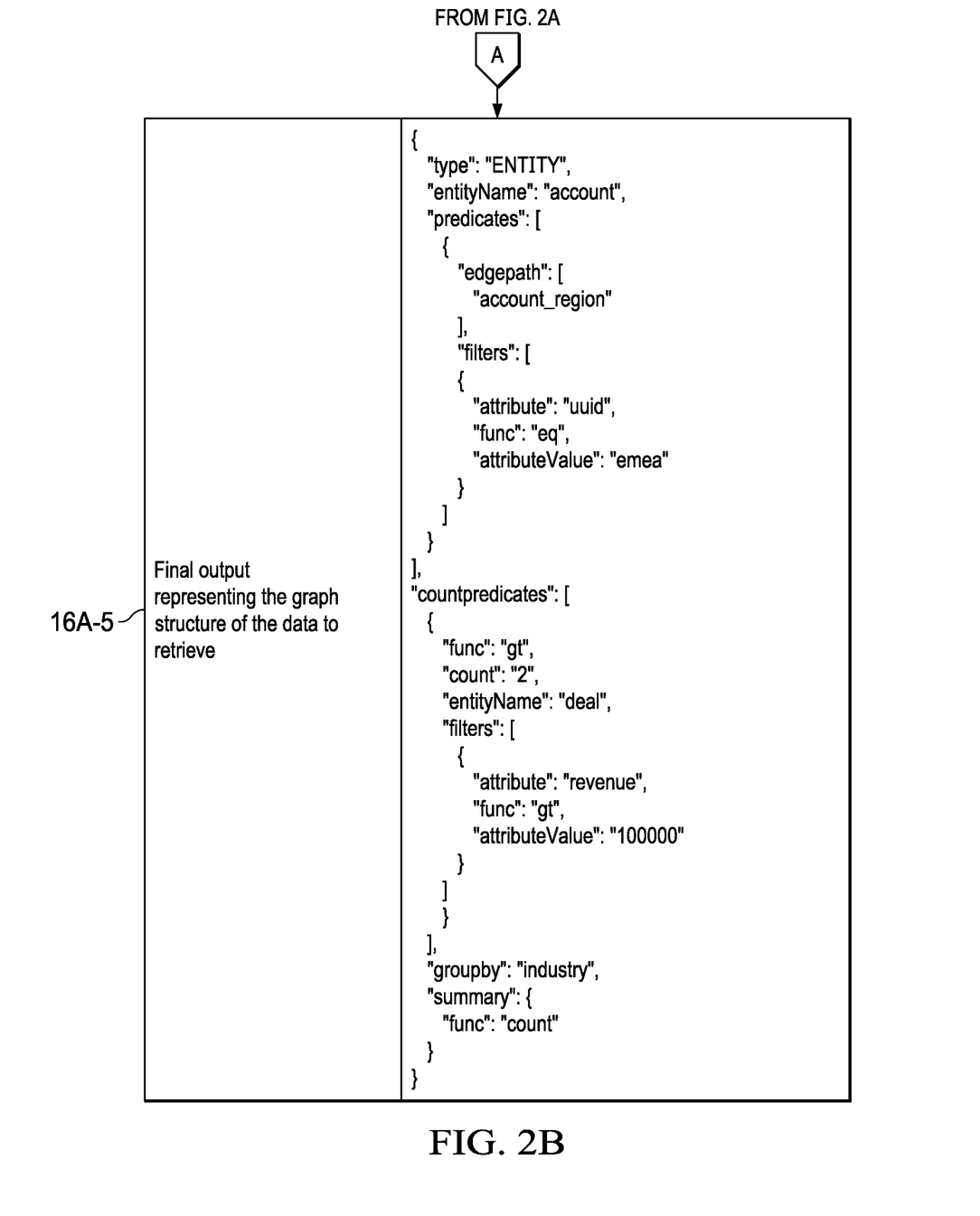

Referring now FIGS. 2A and 2B, illustrated are flow diagrams of an algorithm of the NLP tool 16 that performs POS tagging, word-chunking, criteria establishment, and query construction using text corpuses, database domain ontologies, or any combination thereof, in accordance with example embodiments, denoted generally as 16A. The algorithm 16A begins at block 16A-1 where the algorithm 16A receives the sentence "could you show me the number of accounts in region emea which have at least 2 deals over 100000 and display the result per industry" in a natural language format for processing. At block 16A-2, the algorithm 16A performs POS tagging using known POS tags, see FIG. 1B. The tagged sentence is: "could/MD; you/PRP; show/VB; me/PRP; the/DT; number/NN; of/IN; accounts/NNS; in/IN; region/NN; emea/NN; which/WDT; have/VBP;

at/IN; least/JJS; 2/CD; deals/NNS; over/IN; 100000/CD; and/CC; display/VB; the/DT; result/NN; per/IN; and industry/NN" and the tagged sentence is in a word/grammatical type format.

At block 16A-3, the algorithm 16A processes the tagged sentence using, for example, the tags, word proximity or proximities, or both along with one or more text corpuses, one or more domain ontologies, or any combination thereof in order to establish a user's intent and, therefore, determine serviceable words and phrases. The algorithm 16A determines a database service and other actionable services by chunking words and phrases together and further grouping chunked words and phrases together. The relation of words and phrases are determined using word proximities, punctuation, capitalization, the speech tags, the one or more text corpuses, the one or more domain ontologies, or any combination thereof. Stated differently, the algorithm 16A identifies words and phrases in a sentence structure and creates chunks based on the speech tags and word proximities, punctuation, capitalization one or more text corpuses, one or more database domain ontologies, or any combination thereof. The algorithm 16A establishes intent based on the word and phrase relations and can identify chunk tokens that are relatable to the words and phrases and append the tokens thereto. The tokens map to known parameters, such as query constructs, database entities, database relations, functions, equations, criterion, values, and actions (print a list, send a report, display the results). Based on the mapping, the algorithm 16A can construct a complete database query. Query construct, as used herein, refers a parameter of a known query construction language.

The algorithm 16A can determine if words form a phrase and the meaning of the words and phrases based on whether a word or words modify a subject and are words and phrases known in a database domain ontology or text corpus. Punctuation of a phrase or word can also be used to determine a phrase or a word's meaning. Capitalization of a phrase or word can be used to determine a phrase or word's meaning. Contextual use of a word or a phrase, i.e. the meaning of other words in relation to a particular word or phrase, can help to determine a phrase or word's meaning. For example, south in South Africa modifies Africa but the algorithm can discern the user's intent based on the proximity of the two words, capitalization, and other contextual, relevant, proximal words. Even historical data can be used to discern the user's intent.

The chunks and grouped chunks for the example sentence above are for a database service and are listed as: [SUMMARY [SUMMARY_FUNCTION number/NN]] [ENTITY [ENTITY_account accounts/NNS]] [PREDICATE [RELATION in/IN]; [NAMED_ENTITY[ENTITY [ENTITY_region region/NN]] [NOUN_ENTITY emea/NN]]][COUNT_PREDICATE [COUNTFUNC_gt at/IN least/JJS] [VALUE 2/CD] [ENTITY [ENTITY_deal deals/NNS] [CRITERIA_LIST [CRITERIA [FUNC_gt over/IN] [VALUE 100000/CD]]]]] [GROUPBY per/IN [ENTITY [ENTITY_industry industry/NN]] ]. The chunks comprise chunk tokens, groupings of chunk tokens, and values formed using a database domain ontology and user input. As previously stated, the tokens map to known database parameters and values, such as database entities, database relations, database equations, database functions, database entity criterion, database relation criterion, and defined values. The tokens also map to constructs used to build database queries. Stated differently, the chunks comprise known constructs, database parameters, and values. The words in all capital letters, such as SUMMARY, SUMMARY_FUNCTION, NN, ENTITY, etc. . . . are parameters specific to a particular database or parameters specific to the query constructor of the algorithm 16 needs to construct a query.

Figure 3:
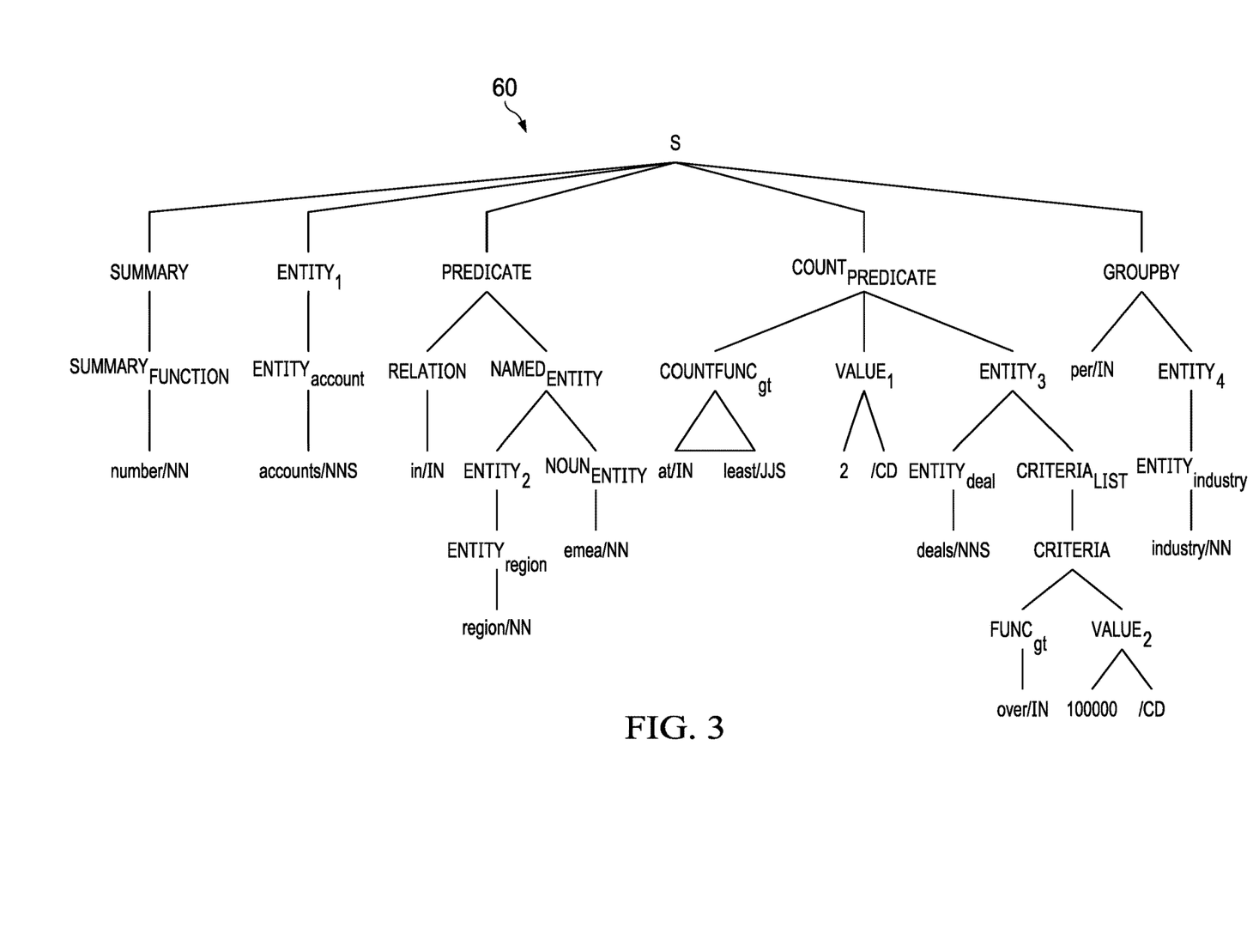
FIG. 3 is an illustration of a tree diagram representing a sentence structure mapped to database parameters, entities, relations, functions, criterion, and their interdependencies, in accordance with certain example embodiments.

At block 16A-4, the algorithm 16A determines the criterion associated with the tokenized sentence. Based on the user' input of "number," "at least," "2," "over," "100000," associated tag, ontologies, and corpuses, the algorithm 16A determines which functions and criterion the user intends. The algorithm 16A determines that a summary function (total number), a count function (at least or greater than), and an initial value of 2 for the count function, a function (greater than), a function value (100000) is needed. Based on the user's input of "accounts," "region," "emea," and "deal," associated tags, ontologies, and corpuses, the algorithm 16A determines which database entities, database relations, database entity criterion, database relation criterion, or any combination thereof are needed. The algorithm 16A determines that database entities and database entity criterion "Account" and "Deal" are needed and the database relations and database relation criterion "Region" and "emea." The criterion for the entities and relations can be found in the identified functions and values. Obviously, the term relation is defined as having an association with an entity and can therefore be considered a criterion when considering intent. The results of block 16A-3 and 16A-4 can be found in FIG. 3. Illustrated is a tree diagram representing a sentence structure mapped to database parameters, such as entities, relations, functions, criterion, and their interdependencies. Stated differently, FIG. 3 is diagram of a sample database domain ontology identifying their database parameters, such as entities, relations, functions, criterion, and their interdependencies.

At block 16A-5, the algorithm 16A constructs a database query based on the tokenized sentence. As is illustrated, using the tokenized sentence, the algorithm 16A can automatically generate a query construct based on the established intent and, therefore, render a database service with a user only requiring minimal understanding of a database structure.

Figure 4:
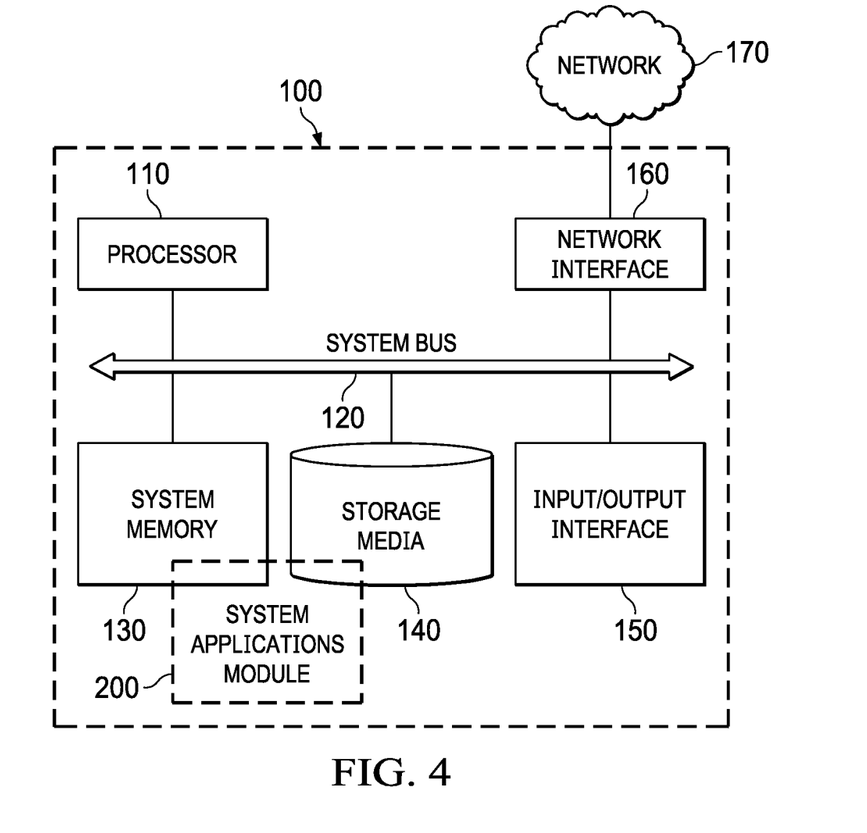
FIG. 4 is an illustration of a computing machine and a system applications module, in accordance with example embodiments.

Referring now to FIG. 4, illustrated is a computing machine 100 and a system applications module 200, in accordance with example embodiments. The computing machine 100 can correspond to any of the various computers, mobile devices, laptop computers, servers, embedded systems, or computing systems presented herein. The module 200 can comprise one or more hardware or software elements designed to facilitate the computing machine 100 in performing the various methods and processing functions presented herein. The computing machine 100 can include various internal or attached components such as a processor 110, system bus 120, system memory 130, storage media 140, input/output interface 150, a network interface 160 for communicating with a network 170, e.g. a loopback, local network, wide-area network, cellular/GPS, Bluetooth, WIFI, and WIMAX.

The computing machine 100 can be implemented as a conventional computer system, an embedded controller, a laptop, a server, a mobile device, a smartphone, a wearable computer, a customized machine, any other hardware platform, or any combination or multiplicity thereof. The computing machine 100 and associated logic and modules can be a distributed system configured to function using multiple computing machines interconnected via a data network and/or bus system.

The processor 110 can be designed to execute code instructions in order to perform the operations and functionality described herein, manage request flow and address mappings, and to perform calculations and generate commands. The processor 110 can be configured to monitor and control the operation of the components in the computing machines. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing machine 100 can be a software based or hardware based virtualized computing machine executing within one or more other computing machines.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing machine, one skilled in the art will recognize that the system memory 130 can be separate from the computing machine 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing machine. The storage media 140 can also be part of one or more other computing machines that are in communication with the computing machine such as servers, database servers, cloud storage, network attached storage, and so forth.

The applications module 200 can comprise one or more hardware or software elements configured to facilitate the computing machine with performing the various methods and processing functions presented herein. The applications module 200 can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 can comprise a computer software product. It should be appreciated that a computer software product comprising the applications module 200 can also be associated with one or more processes or methods for delivering the applications module 200 to the computing machine 100 via a network, any signal-bearing medium, or any other communication or delivery technology. The applications module 200 can also comprise hardware circuits or information for configuring hardware circuits such as microcode or configuration information for an FPGA or other PLD. In one exemplary embodiment, applications module 100 can include algorithms capable of performing the functional operations described by the flow charts and computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing machine or the processor 110. The I/O interface 150 can be configured to communicate data, addresses, and control signals between the peripheral devices, the computing machine, or the processor 110. The I/O interface 150 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing machine, or the processor 120.

The I/O interface 120 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 120 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 100 can operate in a networked environment using logical connections through the network interface 160 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 110 can be connected to the other elements of the computing machine or the various peripherals discussed herein through the system bus 120. It should be appreciated that the system bus 120 can be within the processor 110, outside the processor 110, or both. According to some embodiments, any of the processors 110, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus comprising: an interface for receiving a data retrieval request formatted in a natural language; and a natural language processor for processing the data retrieval request, processing the data retrieval request includes: identifying at least one database entity, at least one database relation, at least one database entity criteria, at least one database relation criteria, or any combination thereof based on at least one word in the data retrieval request; and generating a database query based on the at least one database entity, the at least one database relation, the at least one database entity criteria, the at least one database relation criteria, or any combination thereof; causing the database query to be applied to a database; and wherein the natural language processor uses database domain ontology to process the data retrieval request;

Clause 2, the apparatus of clause 1, wherein processing the data retrieval request further includes: grammatically tagging the data retrieval request; identifying at least one selected from a group consisting of a linguistic group, a common entity noun, a database entity, a database entity criteria, a database relation, and a database relation criteria using the tagged data retrieval request and the database domain ontology; and creating at least one chunk, each chunk comprising at least one selected from a group consisting of the linguistic group, the common entity noun, the database entity, the database relation, the database entity criteria, and the database relation criteria;

Clause 3, the apparatus of any of the preceding clauses, wherein processing the data retrieval request further includes grammatically tagging the data retrieval request by identifying each word or multiple words as having a grammatical type, grammatical context, semantic, or any combination thereof;

Clause 4, the apparatus of any of the preceding clauses, further comprising associating each chunk comprising the database entity criteria or database relation criteria with the common entity noun, the at least one database entity, the at least one database relation, or any combination thereof using the database ontology;

Clause 5, the apparatus of any of the preceding clauses, wherein each chunk comprising the database entity criteria or database relation criteria is associated with the common entity noun, the at least one database entity, the at least one database relation, or any combination thereof based on attribute proximity to the common entity noun, the at least one database entity, the at least one database relation, or any combination thereof;

Clause 6, the apparatus of any of the preceding clauses, where the at least one database entity criteria or the at least one database relation criteria comprises at least one database attribute, at least one database function, at least one value, or any combination thereof;

Clause 7, the apparatus of any of the preceding clauses, wherein the database ontology comprises one or more text corpus, a database schema, a database base model, or any combination thereof;

Clause 8, a system comprising: an interface for receiving a data retrieval request formatted in a natural language; and a natural language processor for processing the data retrieval request, processing the data retrieval request includes: identifying at least one database entity, at least one database relation, at least one database entity criteria, at least one database relation criteria, or any combination thereof based on at least one word in the data retrieval request; and generating a database query based on the at least one database entity, the at least one database relation, the at least one database entity criteria, the at least one database relation criteria, or any combination thereof; and a database for receiving the database query and generating a response; wherein the natural language processor uses database domain ontology to process the data retrieval request;

Clause 9, the system of clause 8, wherein processing the data retrieval request further includes: grammatically tagging the data retrieval request; identifying at least one selected from a group consisting of a linguistic group, a common entity noun, a database entity, a database entity criteria, a database relation, and a database relation criteria using the tagged data retrieval request and the database domain ontology; and creating at least one chunk, each chunk comprising at least one selected from a group consisting of the linguistic group, the common entity noun, the database entity, the database relation, the database entity criteria, and the database relation criteria;

Clause 10, the system of any of the preceding clauses, wherein processing the data retrieval request further includes grammatically tagging the data retrieval request by identifying each word or multiple words as having a grammatical type, grammatical context, semantic, or any combination thereof;

Clause 11, the system of any of the preceding clauses, further comprising associating each chunk comprising the database entity criteria or database relation criteria with the common entity noun, the at least one database entity, the at least one database relation, or any combination thereof using the database ontology;

Clause 12, the system of any of the preceding clauses, wherein each chunk comprising the database entity criteria or database relation criteria is associated with the common entity noun, the at least one database entity, the at least one database relation, or any combination thereof based on attribute proximity to the common entity noun, the at least one database entity, the at least one database relation, or any combination thereof;

Clause 13, the system of any of the preceding clauses, where the at least one database entity criteria or the at least one database relation criteria comprises at least one database attribute, at least one database function, at least one value, or any combination thereof;

Clause 14, the system of any of the preceding clauses, wherein the database ontology comprises one or more text corpus, a database schema, a database base model, or any combination thereof;

Clause 15, a method comprising: receiving a data retrieval request formatted in a natural language; identifying at least one database entity, at least one database relation, at least one database entity criteria, at least one database relation criteria, or any combination thereof based on at least one word in the data retrieval request; generating a database query based on the at least one database entity, the at least one database relation, the at least one database entity criteria, the at least one database relation criteria, or any combination thereof; and causing the database query to be applied to a database;

Clause 16, the method of clause 15, further comprising: grammatically tagging the data retrieval request; identifying at least one selected from a group consisting of a linguistic group, a common entity noun, a database entity, a database entity criteria, a database relation, and a database relation criteria using the tagged data retrieval request and the database domain ontology; and creating at least one chunk, each chunk comprising at least one selected from a group consisting of the linguistic group, the common entity noun, the database entity, the database relation, the database entity criteria, and the database relation criteria;

Clause 17, the method of any of the preceding clauses, further comprising grammatically tagging the data retrieval request by identifying each word or multiple words as having a grammatical type, grammatical context, semantic, or any combination thereof;

Clause 18, the method of any of the preceding clauses, further comprising associating each chunk comprising the database entity criteria or database relation criteria with the common entity noun, the at least one database entity, the at least one database relation, or any combination thereof using the database ontology;

Clause 19, the method of any of the preceding clauses, further comprising associating each chunk comprising the database entity criteria or database relation criteria with the common entity noun, the at least one database entity, the at least one database relation, or any combination thereof based on attribute proximity to the common entity noun, the at least one database entity, the at least one database relation, or any combination thereof; and Clause 20, the method of any of the preceding clauses, wherein the database ontology comprises one or more text corpus, a database schema, a database base model, or any combination thereof.

What is claimed is:

1. An apparatus comprising:
   an interface for receiving a data retrieval request formatted in a natural language; and
   a natural language processor for processing the data retrieval request, processing the data retrieval request includes:
      identifying at least one database entity, at least one database relation, at least one database entity criteria, at least one database relation criteria, or any combination thereof based on at least one word in the data retrieval request; and
      generating a database query based on the at least one database entity, the at least one database relation, the at least one database entity criteria, the at least one database relation criteria, or any combination thereof;
   causing the database query to be applied to a database; and
   wherein the natural language processor uses database domain ontology to process the data retrieval request.

2. The apparatus of claim 1, wherein processing the data retrieval request further includes:
   grammatically tagging the data retrieval request;
   identifying at least one selected from a group consisting of a linguistic group, a common entity noun, a database entity, a database entity criteria, a database relation, and a database relation criteria using the tagged data retrieval request and the database domain ontology; and
   creating at least one chunk, each chunk comprising at least one selected from a group consisting of the linguistic group, the common entity noun, the database entity, the database relation, the database entity criteria, and the database relation criteria.

3. The apparatus of claim 2, wherein processing the data retrieval request further includes grammatically tagging the data retrieval request by identifying each word or multiple words as having a grammatical type, grammatical context, semantic, or any combination thereof.

4. The apparatus of claim 2, further comprising associating each chunk comprising the database entity criteria or database relation criteria with the common entity noun, the at least one database entity, the at least one database relation, or any combination thereof using the database ontology.

5. The apparatus of claim 2, wherein each chunk comprising the database entity criteria or database relation criteria is associated with the common entity noun, the at least one database entity, the at least one database relation, or any combination thereof based on attribute proximity to the common entity noun, the at least one database entity, the at least one database relation, or any combination thereof.

6. The apparatus of claim 1, where the at least one database entity criteria or the at least one database relation criteria comprises at least one database attribute, at least one database function, at least one value, or any combination thereof.

7. The apparatus of claim 1, wherein the database ontology comprises one or more text corpus, a database schema, a database base model, or any combination thereof.

8. A system comprising:
   an interface for receiving a data retrieval request formatted in a natural language; and
   a natural language processor for processing the data retrieval request, processing the data retrieval request includes:
      identifying at least one database entity, at least one database relation, at least one database entity criteria, at least one database relation criteria, or any combination thereof based on at least one word in the data retrieval request; and generating a database query based on the at least one database entity, the at least one database relation, the at least one database entity criteria, the at least one database relation criteria, or any combination thereof; and a database for receiving the database query and generating a response;

wherein the natural language processor uses database domain ontology to process the data retrieval request.

9. The system of claim 8, wherein processing the data retrieval request further includes:

grammatically tagging the data retrieval request;

identifying at least one selected from a group consisting of a linguistic group, a common entity noun, a database entity, a database entity criteria, a database relation, and a database relation criteria using the tagged data retrieval request and the database domain ontology; and creating at least one chunk, each chunk comprising at least one selected from a group consisting of the linguistic group, the common entity noun, the database entity, the database relation, the database entity criteria, and the database relation criteria.

10. The system of claim 9, wherein processing the data retrieval request further includes grammatically tagging the data retrieval request by identifying each word or multiple words as having a grammatical type, grammatical context, semantic, or any combination thereof.

11. The system of claim 9, further comprising associating each chunk comprising the database entity criteria or database relation criteria with the common entity noun, the at least one database entity, the at least one database relation, or any combination thereof using the database ontology.

12. The system of claim 9, wherein each chunk comprising the database entity criteria or database relation criteria is associated with the common entity noun, the at least one database entity, the at least one database relation, or any combination thereof based on attribute proximity to the common entity noun, the at least one database entity, the at least one database relation, or any combination thereof.

13. The system of claim 8, where the at least one database entity criteria or the at least one database relation criteria comprises at least one database attribute, at least one database function, at least one value, or any combination thereof.

14. The system of claim 8, wherein the database ontology comprises one or more text corpus, a database schema, a database base model, or any combination thereof.

15. A method comprising:

receiving a data retrieval request formatted in a natural language;

identifying at least one database entity, at least one database relation, at least one database entity criteria, at least one database relation criteria, or any combination thereof based on at least one word in the data retrieval request;

generating a database query based on the at least one database entity, the at least one database relation, the at least one database entity criteria, the at least one database relation criteria, or any combination thereof; and causing the database query to be applied to a database.

16. The method of claim 15, further comprising:

grammatically tagging the data retrieval request;

identifying at least one selected from a group consisting of a linguistic group, a common entity noun, a database entity, a database entity criteria, a database relation, and a database relation criteria using the tagged data retrieval request and a database domain ontology; and creating at least one chunk, each chunk comprising at least one selected from a group consisting of the linguistic group, the common entity noun, the database entity, the database relation, the database entity criteria, and the database relation criteria.

17. The method of claim 16, further comprising grammatically tagging the data retrieval request by identifying each word or multiple words as having a grammatical type, grammatical context, semantic, or any combination thereof.

18. The method of claim 16, further comprising associating each chunk comprising the database entity criteria or database relation criteria with the common entity noun, the at least one database entity, the at least one database relation, or any combination thereof using the database ontology.

19. The method of claim 16, further comprising associating each chunk comprising the database entity criteria or database relation criteria with the common entity noun, the at least one database entity, the at least one database relation, or any combination thereof based on attribute proximity to the common entity noun, the at least one database entity, the at least one database relation, or any combination thereof.

20. The method of claim 16, wherein the database ontology comprises one or more text corpus, a database schema, a database base model, or any combination thereof.

* * * * *